US008672288B2

(12) United States Patent
van der Tempel et al.

(10) Patent No.: US 8,672,288 B2
(45) Date of Patent: Mar. 18, 2014

(54) VESSEL, MOTION PLATFORM, METHOD FOR COMPENSATING MOTIONS OF A VESSEL AND USE OF A STEWART PLATFORM

(75) Inventors: Jan van der Tempel, Delft (NL); David Julio Cerda Salzmann, The Hague (NL); Jillis Koch, The Hague (NL); Frederik Gerner, The Hague (NL); Arie Jan Göbel, Rijswijk (NL)

(73) Assignee: Ampelmann Holding B.V., Delft (NL)

( * ) Notice: Subject to any disclaimer, the term of this patent is extended or adjusted under 35 U.S.C. 154(b) by 486 days.

(21) Appl. No.: 12/281,243

(22) PCT Filed: Feb. 28, 2007

(86) PCT No.: PCT/NL2007/050080

§ 371 (c)(1),
(2), (4) Date: Mar. 6, 2009

(87) PCT Pub. No.: WO2007/120039

PCT Pub. Date: Oct. 25, 2007

(65) Prior Publication Data

US 2010/0032543 A1 Feb. 11, 2010

(30) Foreign Application Priority Data

Mar. 1, 2006 (NL) ...................................... 1031263

(51) Int. Cl.
*F16M 13/00* (2006.01)

(52) U.S. Cl.
USPC ........... 248/550; 248/560; 248/562; 248/603; 248/618; 248/638

(58) Field of Classification Search
USPC ................. 248/550, 560, 562, 603, 638, 618; 414/139.6; 212/308
See application file for complete search history.

(56) References Cited

U.S. PATENT DOCUMENTS 3,912,227 A 10/1975 Meeker et al.

(Continued)

FOREIGN PATENT DOCUMENTS

| | | |
|---|---|---|
| GB | 2163402 | 2/1986 |
| GB | 2163402 A | 2/1986 |

OTHER PUBLICATIONS iXSea Sponsors Ampelmann Project (2005) Sea Technology, Jun. 2005, Compass, Publications, Inc. (d10).

(Continued)

*Primary Examiner* — Amy J Sterling
(74) *Attorney, Agent, or Firm* — Swanson & Bratschun, L.L.C.

(57) ABSTRACT

A vessel (1) with a motion compensation platform (4), which platform is provided with at least one carrier (6) for bearing, moving and/or transferring a load, actuators (5) for moving the carrier relative to the vessel, preferably in six degrees of freedom, a control system for driving the actuators (5), and motion sensors for measuring motions of the vessel (1) relative to the at least one element in the surrounding area, which measurements are used as input for the control system, wherein at least one at least partly passive pressure element (9) is provided for applying, during use, a pressure to the carrier for at least partly bearing this.

14 Claims, 5 Drawing Sheets

(56) References Cited

U.S. PATENT DOCUMENTS

| | | | | |
|---|---|---|---|---|
| 4,662,786 | A * | 5/1987 | Cherbonnier | 405/195.1 |
| 4,892,051 | A * | 1/1990 | Taylor et al. | 114/1 |
| 5,605,462 | A | 2/1997 | Denne | |
| 5,947,740 | A | 9/1999 | Kim | |
| 5,975,508 | A * | 11/1999 | Beard | 267/136 |
| 6,032,770 | A * | 3/2000 | Alcone et al. | 188/378 |
| 6,340,137 | B1 * | 1/2002 | Davis et al. | 244/165 |
| 6,468,082 | B1 | 10/2002 | Denne | |
| 6,486,872 | B2 * | 11/2002 | Rosenberg et al. | 345/161 |
| 6,659,703 | B1 | 12/2003 | Kirkley | |
| 7,124,660 | B2 * | 10/2006 | Chiang | 74/490.05 |
| 8,095,268 | B2 * | 1/2012 | Parison et al. | 701/37 |
| 2003/0075407 | A1 * | 4/2003 | Taylor | 188/380 |

OTHER PUBLICATIONS

M&C (2005) Press Release 16/2005 TU Delft, Feb. 16, 2005, "Swells Neutralised During Offshore Maintenance" (d9).

Mast and Zaaijer (2005) Bericht auf der Copenhagen Offshore Wind 2005, "PhD@Sea—A PhD program on large-scale offshore wind energy in the Netherlands" (d8).

Notice of Opposition dated Feb. 19, 2013, from EP 07768911.5.

Stewart (1965) Proceedings of the Institution of Mechanical Engineers, 1965-66, vol. 180, Part 1, No. 15, pp. 371-378, "A Platform with Six Degrees of Freedom" (d5).

van der Tempel, et al. (2004) Conference & Exhibition Wind Energy 2004 London: EWEA, Nov. 25, 2004, "Der Ampelmann; Safe and easy access to offshore wind turbines". (d6).

* cited by examiner

VESSEL, MOTION PLATFORM, METHOD FOR COMPENSATING MOTIONS OF A VESSEL AND USE OF A STEWART PLATFORM

The invention relates to a vessel with a motion compensation platform.

The invention also relates to a motion platform.

The invention further relates to a method for compensating motions of a vessel.

The invention also relates to the use of a Stewart platform.

A vessel with a Stewart platform for compensating motions of a ship is already known. The platform comprises a surface, borne on six hydraulic cylinders, and motion sensors. During use, with the aid of the sensors, the motions of the respective ship are measured. With the aid of these measurements, the orientation of the hydraulic cylinders is driven continuously so that the surface remains approximately stationary relative to the fixed world. In this manner, motions of the ship are compensated and for instance people or loads can be transferred from the ship onto a stationary offshore construction, or vice versa.

One of the objects of the invention is to improve a motion platform, in particular a vessel with motion platform.

Another object of the invention is to improve the safety of the use of a vessel and/or motion platform.

At least one of these and other objects are achieved with a vessel with a motion compensation platform, which platform is provided with at least one carrier for bearing, moving and/or transferring a load, actuators for moving the at least one carrier relative to the vessel, preferably in six degrees of freedom, a control system for driving the actuators, and motion sensors for measuring motions of the vessel relative to an element in the surrounding area, which measurements are used as input for the control system. Here, at least one at least partly passive pressure element is provided for furnishing, during use, a pressure on the carrier for at least partly bearing this.

The at least partly passive pressure element applies a counterpressure to the carrier, whereby the actuators can be at least partly relieved. As a result, the actuators can be driven with relatively lighter pressure differences, thereby achieving greater precision.

The at least one object mentioned and/or other objects are also achieved with a motion platform particularly suitable for a vessel, which platform is provided with at least one carrier for bearing, moving and/or transferring a load, actuators, for moving the carrier, preferably in six degrees of freedom, relative to at least one fixed point of the actuators, and a control system, the control system being designed for driving the actuators for said relative movement of the carrier, while at least one at least partly passive pressure element is provided for at least partly compensating the mass of the load.

In addition, the at least one object mentioned and/or other objects are achieved with a method for compensating motions of a vessel, wherein the motions of the vessel are measured, wherein a carrier with a load is driven so that the carrier is held substantially stationary relative to an element in the surrounding area, while the gravity of a load is at least partly compensated through the application of a substantially constant counterpressure to the carrier.

The at least one object mentioned and/or other objects are also achieved through the use of a Stewart platform, while the carrier is at least partly borne by at least one substantially passive pressure element, in particular pneumatic means.

It is noted that in U.S. Pat. No. 5,947,740, a motion platform for a simulator is described which, in addition to six actuators, comprises a continuously (i.e. actively) driven hydraulic cylinder for taking away the load of the weight from the other actuators. When moving the platform and setting it at different angles, the pressure on the hydraulic cylinder is measured continuously and adjusted actively to the pressure variations. Contrary to this known pressure element, the at least one pressure element according to the invention is at least partly passive. The at least one pressure element is also particularly suitable for a motion platform for compensating motions of the vessel that is, holding the platform, at least a carrier, approximately stationary relative to an element in the surroundings such as, for instance, the fixed world, such as, for instance, an offshore construction, a quay or the surrounding water, and/or a floating element such as another vessel, etc. In case of a defect in the active drive of the actuators, for instance, the at least one pressure element will remain functional, thereby increasing the safety of the vessel while it remains of relatively limited complexity.

In clarification of the invention, exemplary embodiments of a vessel, motion platform, method and use according to the invention will be further elucidated with reference to the drawing. In the drawing.

Figure 1:
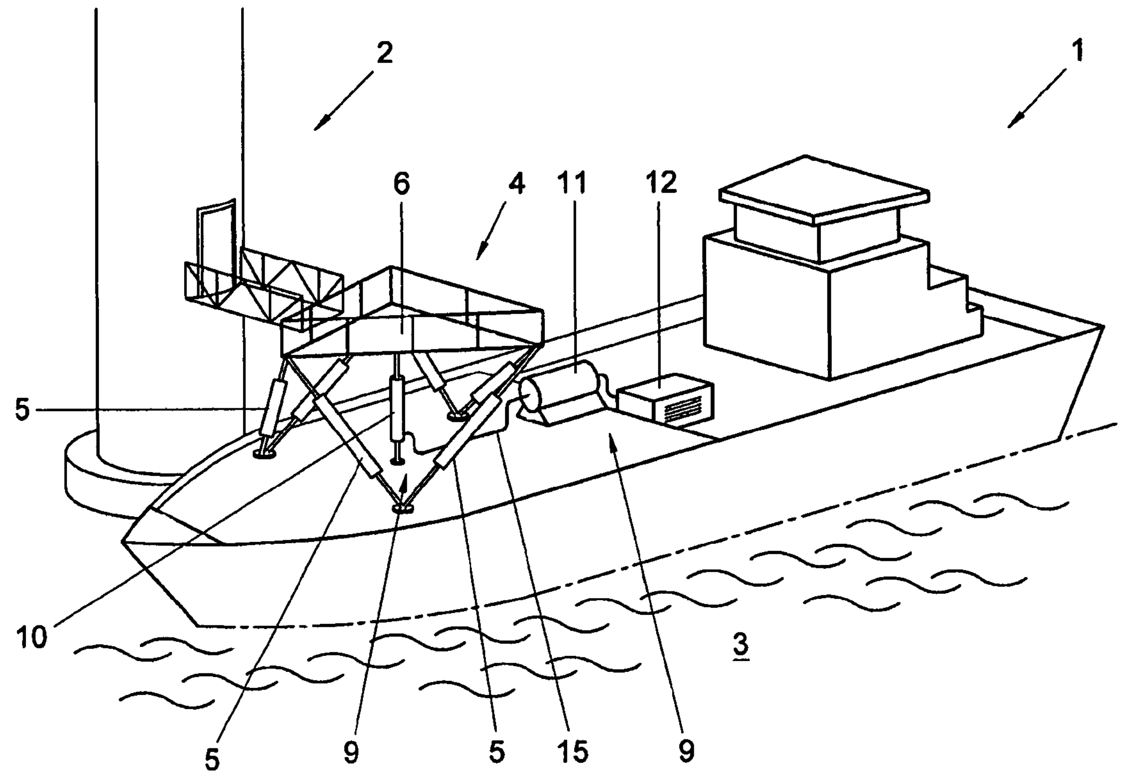
FIG. 1 shows a vessel according to the invention with a part of a windmill.

In this description, identical or corresponding parts have identical or corresponding reference numerals. In the drawing, embodiments are given only as examples. The parts used there are mentioned merely an as example and should not be construed to be limitative in any manner. Other parts too can be utilized within the framework of the present invention.

FIG. 1 schematically shows an embodiment of a vessel 1 according to the invention. With this vessel 1, a load such as for instance people, animals, goods and/or other loads can be transferred from the vessel 1 to a frame or base of, for instance, a windmill 2 at sea 3, and vice versa. For transfer, the vessel 1 is provided with a motion compensation platform 4. This platform will compensate motions of the vessel 1 for the purpose of holding the load relatively still relative to the windmill 2, so that for instance people such as windmill construction personnel can transfer relatively safely. The motions of the vessel 1 that can be compensated may comprise linear motions such as surge (vessel moves from front to back), heave (up and down) and sway (sideways), and rotating motions such as roll (bow from left to right) yaw (the vessel 1 rolls from left to right) and pitch (bow up and down). Naturally, the motions of the vessel 1 are often combinations of these linear and rotational motions.

This transferring from or to the vessel 1 should of course not be limited to the transfer from and/or to windmills 2. In principle, transferring can be carried out between the vessel 1 and any other surrounding element 2. The vessel 1 is suited for transferring, for instance, people, animals and/or loads to, in principle, any offshore construction, such as platforms at sea 3 and/or other constructions in the water 3, etc. In certain embodiments, a vessel 1 according to the invention is designed for transferring to any part connected to the fixed world, such as a quay, a levee, cliffs, steep rocks, (sea) floor etc. In certain embodiments, a vessel 1 has been made suitable for transferring to other moving elements and/or floating elements, such as, for instance, other vessels. To that end, with the aid of, for instance, a camera, optical sensor or the like, the motions of such a moving element can be registered and be compensated by the active components in the motions of the carrier.

Figure 2:
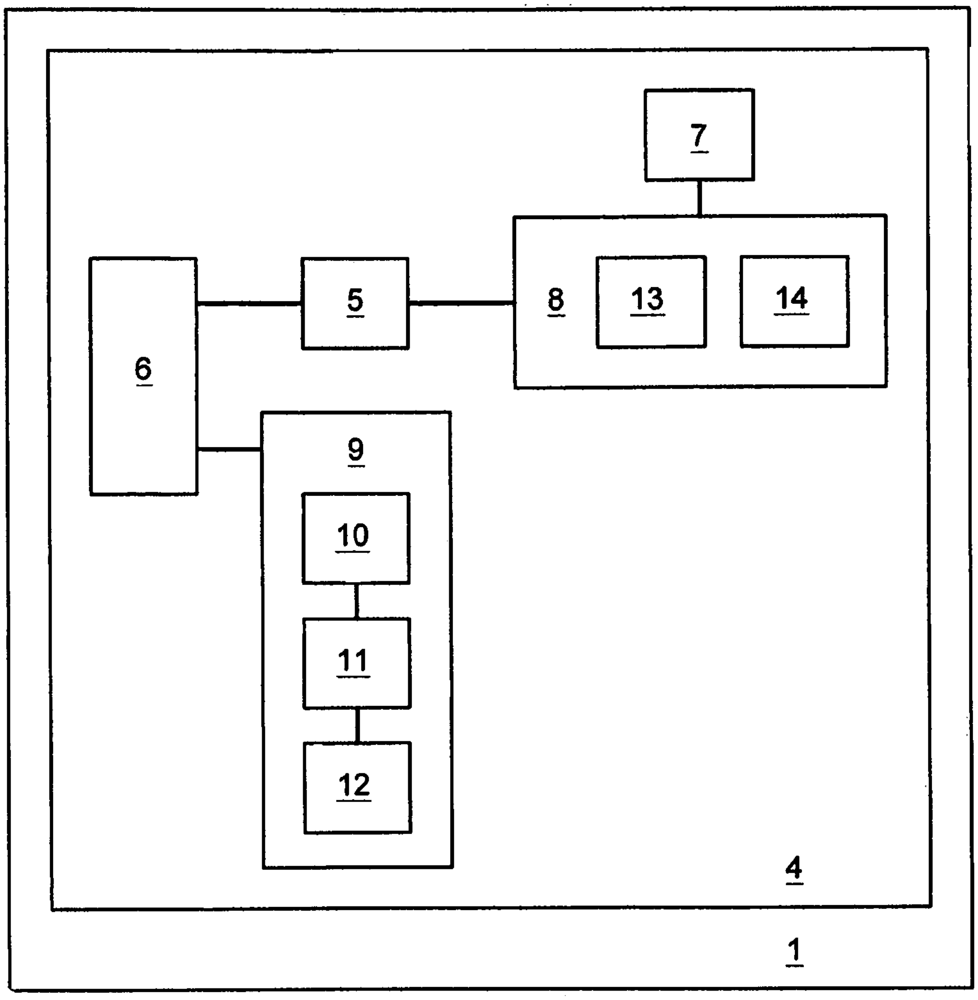
FIG. 2 shows a block diagram of an embodiment according to the invention.

In the embodiment shown, the motion compensation platform 4 is provided with six hydraulic cylinders 5 and a carrier 6. Such a motion platform 4 is known as simulation platform, as "Stewart" platform. The carrier 6 of such a platform 4 is typically movable in six degrees of freedom. In operation, the carrier 6 will be held, within the invention, substantially stationary relative to the windmill 2 by the hydraulic cylinders 5, by means of active drive. To that end, in/on the motion platform 4, and/or in/on the vessel 1, sensors such as motion sensors 7 and a control system 8 are provided, which are shown in FIG. 2. The sensors 2 measure the motions of the vessel 1, for instance the rocking of the vessel 1 in the water 3. With the aid of these measurements, during use, the hydraulic cylinders 5 are driven in order to hold the carrier 6 comparatively stable relative to the windmill 2. Processing these measurements and actively driving the hydraulic cylinders 5 are tasks of the control system 8. To this end, the control system 8 may comprise a microprocessor 13 and a memory 14. In the embodiment shown in FIG. 1, also, pneumatic means 9 are provided with which, during use, a passive compressive force is exerted on the carrier 6, preferably approximately against the gravitational force of the load and the carrier 6, so that the hydraulic cylinders 5 are, at least partly, relieved. With this, the required power of the hydraulic cylinders 5 decreases and, in principle, relatively large loads can be borne. Also, for instance shocks of the carrier 6 with load that may be caused by extreme wave motions can be at least partly absorbed by pneumatic means 9. In this description, 'passive' can be understood to mean not driven, at least not continuously driven, or the pneumatic means 9 will be able to react to the relative motions of the carrier 6 without being driven, virtually without the bearing force provided by the carrier being influenced. Naturally, the pneumatic means 9 can be driven, at least in part, during specific periods, for instance for adjusting the pressure in the pneumatic means 9 upon initiation, or with a changing load.

In the embodiment shown in FIG. 1, the pneumatic means 9 comprise at least one pneumatic cylinder 10 which is placed approximately in the centre of the motion compensation platform 4 and is connected via pipes 15 to a pressure compensator in the form of an accumulator 11 for buffering the compressed air, and a compressor 12 for compressing air. After filling with compressed air in the pneumatic cylinder 10 and the accumulator 11, after provision of a load, the cylinder 10 will remain pressurized and it can continue bearing at least a part of the load. The pneumatic cylinder 10 has the property of passively moving along in its longitudinal direction. Motions of the carrier 6 in the longitudinal direction of the cylinder 10 are followed by compression and expansion of the air in the cylinder 10 and the accumulator 11. Small pressure losses in the pneumatic cylinder 10 through, for instance, friction can be measured and compensated with the aid of, for instance, the compressor 12 and/or the control system 8. Such pneumatic means 9 are known per se from the so-called 'heave compensation' systems. By placing this longitudinal direction in the direction of gravity, a great force, e.g. that of the weight of the carrier 6 and the load, will be continuously absorbed by the passive pneumatic means 9, and hence also in the case of a defect in the active elements of the motion compensation platform 4 such as, for instance, the sensors 7, the control system 8 and/or the hydraulic cylinders. In particular embodiments, the pneumatic means 9 are advantageously placed in other directions, for instance for compensating the tilting motions of the carrier 6 after, for instance, a defect. In this way, upon a defect of an element such as a cylinder 5, the pneumatic means 9 can prevent the motion compensation platform from making a relatively unsafe motion, such as, for instance, collapsing. Defects that might occur are, for instance, power supply failure or valves in the active hydraulic system becoming wedged. Naturally, also, other, preferably passive, pressure systems 9 can be utilized within the framework of the invention. In certain embodiments, instead of and/or in addition to pneumatic means 8, that is the cylinder 10, at least one spring can be utilized as passive element 10, for instance a spiral and/or gas spring. The pneumatic means 9 can, in principle, comprise different types of pressure elements such as, for instance, hydraulic means and/or elastic means and/or a pulling element, etc. Naturally, one or more pressure elements can be utilized. Depending on, for instance, the expected use, desired precision and/or economic considerations, one particular type, one particular amount and/or positioning can be selected. A passive pressure system 9 provides security in that it will, in principle, not fail and can remain functional without continuous actuation. Also, such a passive system 9 can remain of limited complexity.

As stated, the pneumatic means 9 relieve the hydraulic cylinders 5. In particular embodiments, this results in that less oil has to be circulated for holding the carrier 6 stable upon motions of the vessel 1. In one embodiment, the pneumatic means 9 may be set, with the aid of the compressor 12, for providing a compressive force that absorbs at least a large part of the weight of the carrier 6 and the load. Partly because of the mass inertia of the carrier 6 and the load, and the constant pressure provided by the cylinder 10 and the accumulator 11 on the carrier 6, in one embodiment, the carrier 6 will tend to remain approximately stationary relative to the fixed world. Consequently, the hydraulic cylinders 5 can compensate the motions of the vessel 1 with relatively small forces, i.e., hold the carrier 6 approximately stationary relative to an element in the surrounding area.

In one embodiment, the pneumatic means 9 are also designed for preventing the reinforcement of particular motions of the vessel 1, for instance through the forces exerted by the hydraulic cylinders 5 on the vessel 1. As indicated in an exaggerated, schematic manner in FIG. 3, it may for instance be so that if the vessel tilts towards a particular side, a hydraulic cylinder 5*a* stretches to compensate this tilting. At any moment, in particular at the moment the vessel tilts back again, it may be so that the cylinder 5*a* is still being driven so as to stretch, whereby a force F is exerted on the side of the vessel 1. This may cause reinforcement of particular motions of the vessel 1. As already explained, with the pneumatic means 11, in particular the pneumatic cylinder 10 in FIG. 3, the forces of and on the hydraulic cylinders 5 will remain relatively limited. That is why in certain embodiments, this reinforcement of motions remains limited during use of the vessel. In a further embodiment, an algorithm is included in the control system 8, which can anticipate a delay and/or reversal of a motion of the vessel 1, so that the hydraulic cylinders 5 can be driven while anticipating the respective motion of the vessel 1. In this manner too, the reinforcement of the motions of the vessel 1 mentioned is prevented.

In particular embodiments, the motion sensors 7 comprise known motion sensors 7 such as for measuring motions of the vessel 1, for instance accelerometers or dynamometers. With known accelerometers, the motion of the vessel 1 relative to the fixed world can be measured. Also, in particular embodiments, other types of sensors 7 can be utilized, such as for instance cameras, GPS (Global Positioning System), sensors utilizing electromagnetic waves, sonic waves, etc. The sensors 7 may measure the position of the vessel 1 relative to one or more elements in the surrounding area, such as for instance another vessel 1 and/or the fixed world. The information the control system 8 receives from the motions sensors 7 is processed via, for instance, preprogrammed algorithms so that the hydraulic cylinders 5 can be driven for holding the carrier 6 approximately stationary relative to the respective at least one element in the surrounding area.

In particular embodiments, the control system 8 comprises, in addition to algorithms for driving the hydraulic cylinders 5, a drive for anticipating specific motions of the vessel 1. Through recognition of, for instance, a specific order in the motions of the vessel 1, the control system 8 drives the cylinders 5 proactively. In this manner, the forces of the hydraulic cylinders 5 on the vessel 1 can remain as small as possible and motions of the vessel 1 can be prevented from being unfavourably influenced, at least being reinforced.

The operation of an embodiment of the motion platform 4 is approximately as follows. When the vessel 1 is close to the windmill 2, the platform 4 is activated. The pressure in the pneumatic means 9 is increased with the aid of the compressor 12 to approximately the weight of the carrier 6 and a load thereon, so that carrier 6 and load, or a part thereof, are borne by the pneumatic means 9. This may be carried out in cooperation with measurements from the hydraulic cylinders 5 and/or the motion sensors 7, with which the weight and or the motion of the vessel 1, respectively, can be measured relatively simply. Naturally, also, other weight meters and/or methods for measuring the weight and/or motions can be utilized for setting the desired pressure in the pneumatic means 9. In addition, the velocities and accelerations of the motions of the vessel 1 are measured with the motion sensors 7, which measurements are used as input for the control system 8. Through continuous adjustment of the six cylinders 5, the carrier 6 will be able to virtually stand still relative to the windmill 2. After that, a hatch or gangplank connected to the platform 4 and/or the windmill 2 can be lowered so that personnel and/or the load can be transferred safely.

Figure 4:
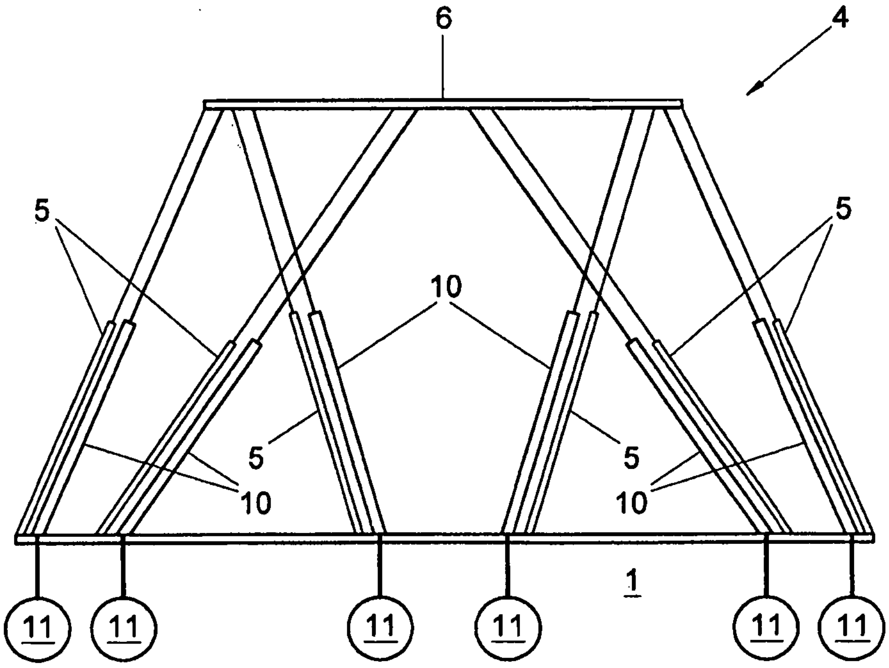
FIG. 4 shows a schematic view of a motion platform according to the invention.
Figure 5:
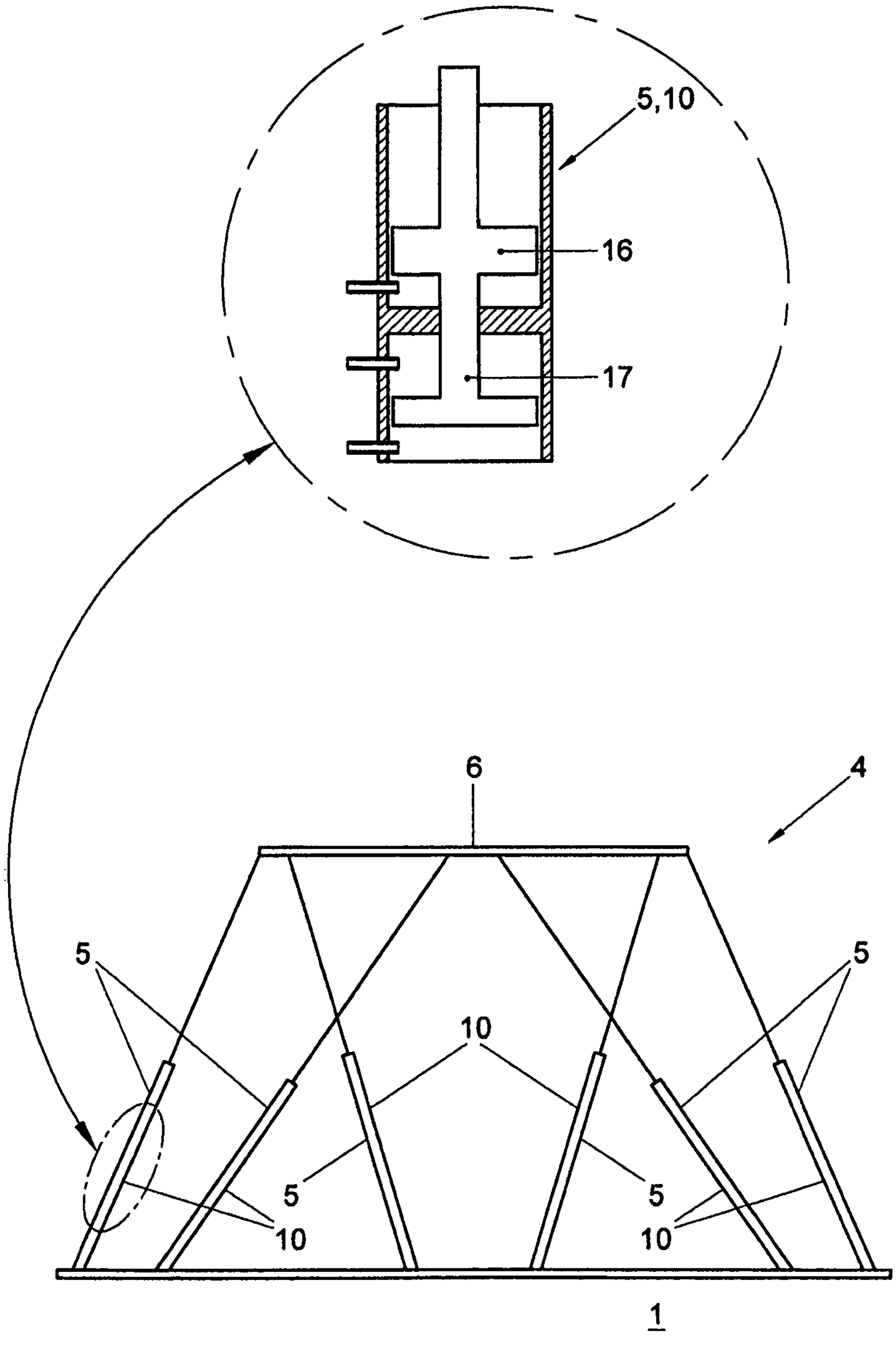
FIG. 5 shows a schematic view of a motion platform according to the invention with an enlargement of a cross-section of a part of a hydraulic pneumatic cylinder.

In certain embodiments, the pneumatic means comprise several pneumatic cylinders 10. As shown in FIG. 4, one pneumatic cylinder 10 can be provided per hydraulic cylinder 5. Here, in the event of a defect in a hydraulic cylinder 5, a possible undesired motion of this cylinder 5 will be prevented by the respective pneumatic cylinder 10. According to this same principle, the hydraulic cylinder 5 and the pneumatic cylinder 10 can be integrated, as shown in FIG. 5. Here, the integrated cylinder 5, 10 comprises, for instance, an integrated piston with a passive, preferably pneumatic piston part 16 and an actively driven, preferably hydraulic piston part 17. It will be clear that, within the framework of the invention, several hydraulic 5 and/or pneumatic cylinders 10 can be placed. In the embodiments of FIGS. 4 and 5, the passive cylinder 10, or the passive part of the cylinder 16, bears the largest part of the load and the active cylinder 5, or the active part of the cylinder 17, adjusts the carrier 6.

Figure 3:
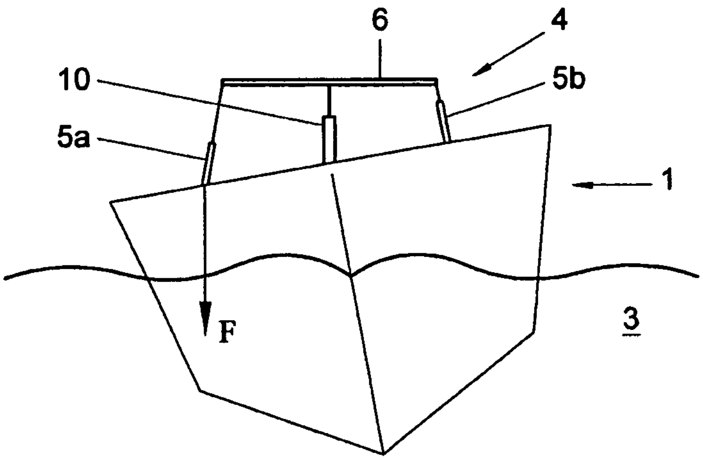
FIG. 3 shows a schematic view of a moving vessel according to the invention.
Figure 6:
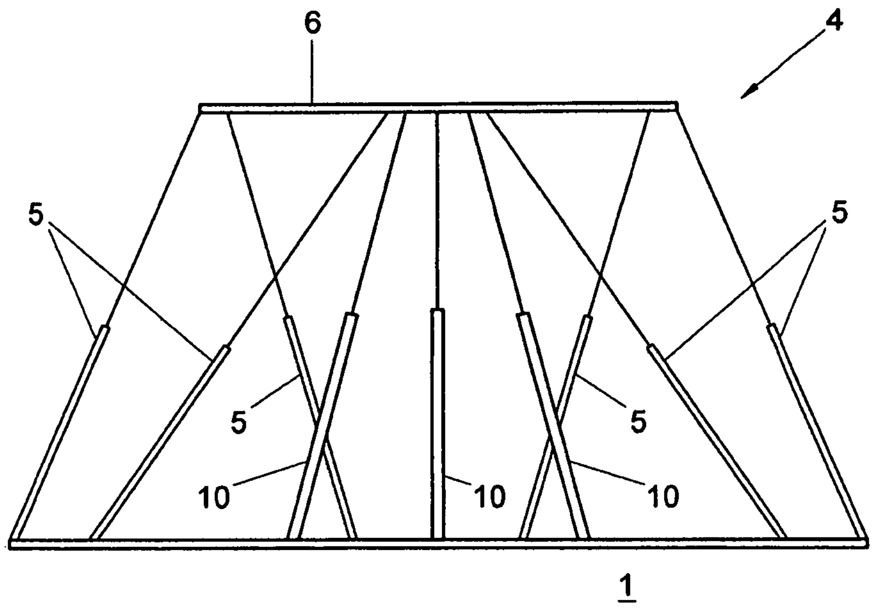
FIGS. 6 and 7 show a schematic view of different motion platforms according to the invention.
Figure 7:
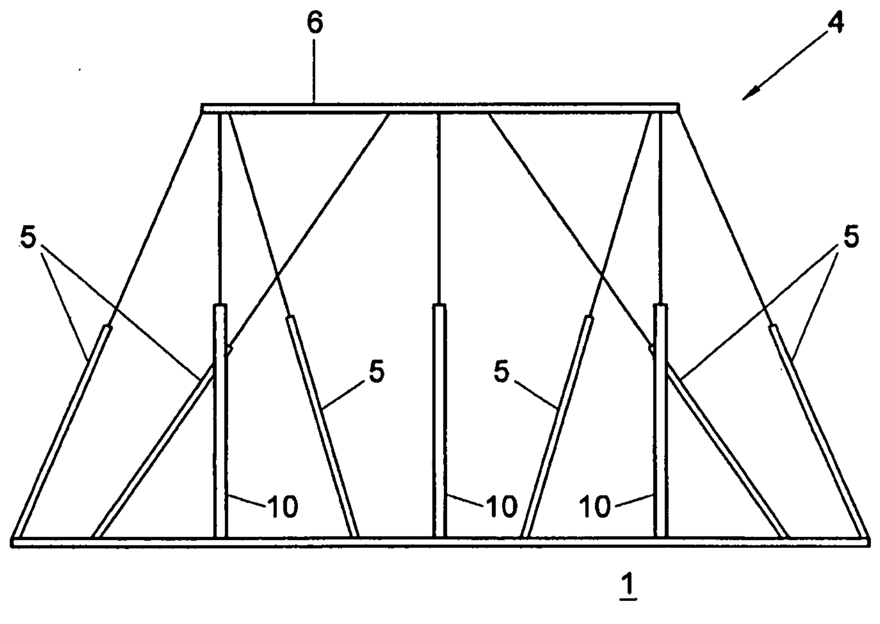

As shown in the schematic embodiment of FIG. 6, it is also possible to have several pneumatic cylinders 10 furnish pressure on or adjacent the centre of the carrier 6. With this, the safety can be even further increased. Also, upon, for instance, a tilting motion as represented in FIG. 3, the pneumatic cylinder 10 positioned best to that end can compensate a vessel motion reinforcing motion of a hydraulic cylinder 5. To this end, the pneumatic cylinders 10 can also be positioned in an approximately upright manner and distributed below the carrier 6, as highly schematically represented in FIG. 7.

Instead of hydraulic cylinders 5, naturally, also other amounts and types of actuators 6 can be utilized within the framework of the invention. Other embodiments may comprise active pneumatic cylinders, linear motors, electric driving elements etc.

These and may comparable variations, as well as combinations thereof, are understood to fall within the framework of the invention as outlined by the claims. Naturally, different aspects of the different embodiments and/or combinations thereof can be combined with each other and be exchanged within the framework of the invention. Therefore, the embodiments mentioned should not be understood to be limitative.

What is claimed is:

1. A boat comprising:

a motion compensation platform attached to the boat for compensating for motion of the boat as it floats on water, the motion compensation platform comprising:

at least one carrier for bearing and transferring a load to or from the boat floating on water;

actuators operatively associated between the boat and at least one carrier, for moving the at least one carrier relative to the boat;

a control system, for driving the actuators;

and motion sensors for measuring motions of the boat floating on water relative to at least one other element in an area surrounding the boat, which measurements are used as input for the control system to drive the actuators to hold the at least one carrier substantially stationary relative to the at least one other element in the area surrounding the boat; and at least one at least partly passive pressure element operatively associated between the carrier and the boat configured to apply a counter-pressure on the carrier that acts against a gravitational force of the load and the carrier, and relieves weight on the actuators by at least partly bearing the weight of the load and the carrier.

2. The boat according to claim 1, wherein the at least one pressure element is pneumatic.

3. The boat according to claim 1, provided with several pressure elements.

4. The boat according to claim 1, wherein each actuator has a driving direction and wherein for each driving direction at least one corresponding pressure element is provided for applying pressure in a parallel direction.

5. The boat according to claim 1, wherein the at least one pressure element is approximately in the center of the carrier.

6. The boat according to claim 1, wherein a pressure vessel is provided for damping out pressure variations on the at least one pressure element.

7. The boat according to claim 1, wherein a pressure compensator is provided for compensating for changes in the pressure of the at least one pressure element, in particular changes in at least one of the amount of pressure fluid or the load.

8. The boat according to claim 1, wherein the motion compensation platform comprises a Stewart platform with hydraulic cylinders.

9. A motion platform comprising:

at least one carrier, for bearing and transferring a load to or from a boat floating on water to which the motion platform is attached, actuators for moving the carrier relative to at least one other element in an area surrounding a boat floating on water to which the motion platform is attached;

and a control system, the control system being designed for driving the actuators for said relative movement of the carrier to hold the at least one carrier substantially stationary relative to the at least one other element;

motion sensors for measuring motions of a boat floating on water to which the motion platform is attached relative to at least one other element in an area surrounding the boat, which measurements are used as input for the control system; and at least one at least partly passive pressure element for operative association between the carrier and a boat to which the motion platform is attached that applies a counterpressure on the carrier that acts against the gravitational force of the load and the carrier, and relieves weight on the actuators by at least partly bearing the weight of the load and the carrier.

10. A boat comprising:

a motion compensation platform attached to the- boat for compensating of motion of the boat as it floats on water, the motion compensation platform comprising:

at least one carrier for bearing and transferring a load to or from the boat floating on water;

six hydraulic cylinders operatively associated between the boat and at least one carrier, for moving the at least one carrier relative to the boat in six degrees of freedom;

a control system, for driving the hydraulic cylinders;

motion sensors for measuring motions of the boat floating on water relative to at least one other element in an area surrounding the boat, which measurements are used as input for the control system; and at least one a partly passive pressure element operatively associated between the carrier and the boat configured to apply a counterpressure on the carrier that acts against a gravitational force of the load and the carrier, and relieves weight on the actuators by at least partly bearing the weight of the load and the carrier;

wherein the control system drives the six hydraulic cylinders for holding the carrier substantially stationary relative to the other element in the area surrounding the vessel.

11. The boat of claim 10, wherein the at least one partly passive pressure element is connected to a pressure compensator and a compressor.

12. The boat of claim 10, wherein each actuator has a driving direction and wherein for each driving direction at least one corresponding pressure element is provided for applying pressure in a parallel direction.

13. The boat of claim 10, wherein the at least one partly passive pressure element is approximately in the center of the carrier.

14. A boat comprising:

a motion compensation platform attached to the boat for compensating of motion of the boat as it floats on water, the motion compensation platform comprising:

at least one carrier for bearing and transferring a load to or from the boat floating on water;

actuators operatively associated between the boat and at least one carrier, for moving the at least one carrier relative to the boat;

a control system, for driving the actuators;

and motion sensors for measuring motions of the boat floating on water relative to at least one other element in an area surrounding the boat, which measurements are used as input for the control system to drive the actuators to hold the at least one carrier substantially stationary relative to the at least one other element in the area surrounding the boat; and at least one at least partly passive pressure element operatively associated between the carrier and the boat configured to apply a counter-pressure on the carrier that acts against a gravitational force of the load and the carrier, and relieves weight on the actuators by at least partly bearing the weight of the load and the carrier, wherein the control system comprises a drive for anticipating specific motions of the boat floating on water using an algorithm which can anticipate a delay or reversal of a motion of the boat.

* * * * *

UNITED STATES PATENT AND TRADEMARK OFFICE

CERTIFICATE OF CORRECTION

PATENT NO. : 8,672,288 B2
APPLICATION NO. : 12/281243
DATED : March 18, 2014
INVENTOR(S) : van der Tempel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this
Twenty-ninth Day of September, 2015

Michelle K. Lee

Michelle K. Lee
*Director of the United States Patent and Trademark Office*